(12) United States Patent
Bandera

(10) Patent No.: US 10,186,914 B2
(45) Date of Patent: Jan. 22, 2019

(54) INPUT AMPLITUDE MODULATION CONTROL FOR A MULTI-DEGREE OF FREEDOM ELECTROMAGNETIC MACHINE

(71) Applicant: HONEYWELL INTERNATIONAL INC., Morris Plains, NJ (US)

(72) Inventor: Pablo Bandera, Avondale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 338 days.

(21) Appl. No.: 15/208,383

(22) Filed: Jul. 12, 2016

(65) Prior Publication Data

US 2018/0019627 A1   Jan. 18, 2018

(51) Int. Cl.
| | |
|---|---|
| *H02K 1/12* | (2006.01) |
| *H02K 11/33* | (2016.01) |
| *H02K 1/27* | (2006.01) |
| *H02K 11/042* | (2016.01) |
| *H02K 26/00* | (2006.01) |
| *H02K 41/03* | (2006.01) |

(52) U.S. Cl.
CPC ............. *H02K 1/12* (2013.01); *H02K 1/2706* (2013.01); *H02K 11/042* (2013.01); *H02K 11/33* (2016.01); *H02K 26/00* (2013.01); *H02K 41/031* (2013.01); *H02K 2201/18* (2013.01)

(58) Field of Classification Search
CPC ........ H02K 11/042; H02K 11/33; H02K 1/12; H02K 1/2706; H02K 2201/18; H02K 26/00; H02K 41/031
See application file for complete search history.

(56) References Cited

U.S. PATENT DOCUMENTS 4,661,737 A   4/1987   Barri
4,739,241 A   4/1988   Vachtsevanos et al.
(Continued)

FOREIGN PATENT DOCUMENTS

CN   102237834 B   10/2013
EP    1480318 A1   11/2004
(Continued)

OTHER PUBLICATIONS

EP Examination Report for Application No. 17177981.2-1201 dated Mar. 27, 2018.
(Continued)

*Primary Examiner* — Muhammad S Islam
(74) *Attorney, Agent, or Firm* — Lorenz & Kopf, LLP

(57) ABSTRACT

A multi-degree-of-freedom electromagnetic machine includes a stator, an armature, and a control. The stator includes a first stator conductor, a second stator conductor, and a third stator conductor. The armature is disposed adjacent to, and is movable relative to, the stator. The armature includes an armature conductor and a plurality of magnets, where each magnet has at least one of its magnetic poles facing the surface. The control is coupled to the first, second, and third stator conductors, and is configured to supply direct current (DC) to the first, second, and third stator conductors, and to selectively amplitude modulate the DC supplied to one or more of the first, second, and third stator conductors, to thereby electromagnetically couple the armature conductor to the one or more first, second, and third stator conductors.

18 Claims, 10 Drawing Sheets

(56) References Cited

U.S. PATENT DOCUMENTS

| | | | |
|---|---|---|---|
| 5,204,573 A | | 4/1993 | Bederson |
| 6,326,714 B1 * | | 12/2001 | Bandera ................ H02K 26/00 |
| | | | 310/152 |
| 6,906,441 B2 | | 6/2005 | Mendenhall |
| 6,909,205 B2 | | 6/2005 | Corcoran et al. |
| 7,675,208 B2 | | 3/2010 | Bandera |
| 2002/0130561 A1 | | 9/2002 | Temesvary et al. |
| 2004/0042798 A1 * | | 3/2004 | Kehr ................ H04B 10/1123 |
| | | | 398/135 |
| 2004/0124717 A1 | | 7/2004 | Corcoran |
| 2004/0232790 A1 | | 11/2004 | Mendenhall |
| 2008/0073989 A1 | | 3/2008 | Bandera |
| 2008/0111437 A1 * | | 5/2008 | Bandera ................ H02K 21/14 |
| | | | 310/179 |
| 2009/0314116 A1 * | | 12/2009 | Bandera ................ B64C 13/04 |
| | | | 74/471 XY |
| 2009/0319907 A1 * | | 12/2009 | Tokuda ................ G06Q 10/10 |
| | | | 715/739 |
| 2014/0125153 A1 | | 5/2014 | Ho |
| 2014/0191626 A1 | | 7/2014 | Hollis |
| 2014/0203685 A1 | | 7/2014 | Vandenba Viere et al. |
| 2014/0209751 A1 | | 7/2014 | Stagmer |

FOREIGN PATENT DOCUMENTS

| | | |
|---|---|---|
| EP | 2032888 BI | 2/2011 |
| FR | 2040907 A5 | 1/1971 |
| JP | H0685630 B2 | 10/1994 |
| WO | 9919971 A1 | 4/1999 |

OTHER PUBLICATIONS

Extended EP Search Report for Application No. 17177981.2-1809 dated Nov. 22, 2017.

Extended EP Search Report for Application No. 17204227.7 dated Mar. 23, 2018.

USPTO Office Action for U.S. Appl. No. 15/369,023 dated Nov. 3, 2017.

Jun Luo et al.; Structural Design and Analysis of 3-DOF Bionic Eye Based on Spherical Ultrasonic Motor; Springer for Research & Development, Chapter—Intelligent Robotics and Applications, vol. 7506 of the series Lecture Notes in Computer Science pp. 348-356. Retrieved from Internet http://rd.springer.com/chapter/10.1007%2F9783642335099_34; Nov. 11, 2016.

Kaneko, K. et al.; A Spherical DC Servo Motor With Three Degrees of Freedom; Reprinted from Sep. 1989, vol. 111, Journal of Dynamic Systems, Measurement, and Control, Transactions of the ASME.

Nishiura, Y., et al.; 3-DOF outer rotor electromagnetic spherical actuator; Osaka University, Suita, Japan; INTERMAG 2015.

Bolognesi, P., et al.; Electromagnetic Actuators Featuring Multiple Degrees of Freedom: A Survey; Department of Electric Systems & Automation—University of Pisa; Paper to be presented at ICEM 2004 Conference, Krakow (Poland) Sep. 5-8, 2004.

Wang, J, et al.; A Novel Spherical Permanent Magnet Actuator with Three Degrees-of-Freedom; Department of Electronic and Electrical Engineering, The University of Sheffield, IEEE Transactions on Magnetics, vol. 34, No. 4, Jul. 1998.

Yan, L., et al.; Torque Modeling and Analysis of Spherical Actuators with Iron Stator; 2009 IEEE International Conference on Robotics and Automation,Kobe International Conference Center, Kobe, Japan, May 12-17, 2009.

Bandera, P; Three Degree-of-Freedom Electromagnetic Machine Control System and Method, filed with the USPTO on Dec. 5, 2016; U.S. Appl. No. 15/369,023.

USPTO Notice of Allowance for U.S. Appl. No. 15/369,023 dated May 18, 2018.

European Examination Report for Application No. 17177981.2 dated Jul. 13, 2018.

EP Examination Report for Application No. 17 204 227.7-1201 dated Sep. 11, 2018.

* cited by examiner

INPUT AMPLITUDE MODULATION CONTROL FOR A MULTI-DEGREE OF FREEDOM ELECTROMAGNETIC MACHINE

TECHNICAL FIELD

The present invention generally relates to electromagnetic machines, and more particularly relates to systems and methods for controlling a multi-degree of freedom electromagnetic machine using input amplitude modulation.

BACKGROUND

It is generally known that currently available motion control systems that are designed to move an object in more than one degree of freedom (DoF) include a separate motor or actuator for each DoF. More specifically, at least two motors or actuators are needed to implement 2-DoF motion, at least three motors or actuators are needed to implement 3-DoF motion, and so on. Consequently, mechanisms that involve more than one DoF tend to be somewhat large and cumbersome, and therefore inefficient.

While electronics and sensor technologies have gotten significantly smaller in recent years, mechanical motion technology has not kept up. This is why motion systems such as pan/tilt mechanisms are typically not used on smaller platforms, such as mini- or micro-UAVs (unmanned air vehicles) and micro-satellites. Robotics systems, which depend on multi-DoF motion control, must simply put up with the inherent inefficiencies of current motion-on-motion systems.

One solution to the above-described problems is disclosed in U.S. Pat. No. 7,675,208, entitled "Global Pointing Actuator." The actuator disclosed therein includes a spherical stator with a "latitude coil" and a "longitude coil" wound thereon. This actuator, however, also exhibits certain drawbacks. For example, while it can move its associated armature, and thus a device coupled to the armature, in two degrees of freedom by applying direct current (DC) to one or both coils, it cannot do so in three degrees of freedom.

Hence, there is a need for a multi-degree of freedom electromechanical machine that is relatively smaller, less cumbersome, and more efficient than known devices and/or can move in three degrees of freedom. The present invention addresses at least these needs.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a multi-degree-of-freedom electromagnetic machine includes a stator, an armature, and a control. The stator includes a first stator conductor, a second stator conductor, and a third stator conductor. The first stator conductor follows a first general trajectory, the second stator conductor follows a second general trajectory that is different from the first general trajectory, and the third stator conductor follows a third general trajectory that is different from the first and second general trajectories. The first stator conductor, the second stator conductor, and the third stator conductor together form a general shape of a surface. The armature is disposed adjacent to, and is movable relative to, the stator. The armature includes an armature conductor and a plurality of magnets, where each magnet has at least one of its magnetic poles facing the surface. The control is coupled to the first, second, and third stator conductors, and is configured to: (i) supply direct current (DC) to the first, second, and third stator conductors, and (ii) selectively amplitude modulate the DC supplied to one or more of the first, second, and third stator conductors, to thereby electromagnetically couple the armature conductor to the one or more first, second, and third stator conductors.

In another embodiment, a multi-degree-of-freedom electromagnetic machine includes a spherical stator, a first stator conductor, a second stator conductor, a third stator conductor, an armature, and a control. The spherical stator has a first axis of symmetry, a second axis of symmetry, and a third axis of symmetry, where the first, second, and third axes of symmetry are disposed perpendicular to each other. The first stator conductor is disposed on the spherical structure about the first axis of symmetry, the second stator conductor is disposed on the spherical structure about the second axis of symmetry, and the third stator conductor is disposed on the spherical structure about the third axis of symmetry. The armature is disposed adjacent to, and movable relative to, the spherical stator, the armature including an armature conductor and a plurality of magnets, where each magnet having at least one of its magnetic poles facing the surface. The control is coupled to the first stator conductor, the second stator conductor, and the third stator conductor, and is configured to: (i) supply direct current (DC) to the first, second, and third stator conductors, and (ii) selectively amplitude modulate the DC supplied to one or more of the first, second, and third stator conductors, to thereby electromagnetically couple the armature conductor to the one or more first, second, and third stator conductors.

In yet another embodiment, a method of controlling a multi-degree-of-freedom electromagnetic machine that includes a stator and an structure, wherein the stator includes a first stator conductor, a second stator conductor, and a third stator conductor, where the first stator conductor follows a first general trajectory, the second stator conductor follows a second general trajectory that is different from the first general trajectory, the third stator conductor follows a third general trajectory that is different from the first and second general trajectories, and where the first stator conductor, the second stator conductor, and the third stator conductor together form a general shape of a surface; and wherein the armature is disposed adjacent to, and is movable relative to, the stator and includes an armature conductor and a plurality of magnets, each magnet having at least one of its magnetic poles facing the surface, includes the steps of controllably supplying direct current (DC) to one or more of the first, second, and third stator conductors, and selectively amplitude modulating the DC supplied to one or more of the first, second, and third stator conductors, to thereby induce current in the armature conductor.

Furthermore, other desirable features and characteristics of the multi-degree of freedom electromechanical machine will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In this regard, it is noted that the multi-degree of freedom machine disclosed herein is, for ease of explanation and illustration, generally described as operating as a motor. Persons of ordinary skill in the art will appreciate, however, that the disclosed machine may also be operated as a generator by moving the armature with an external force and inducing currents in the conductors, or as a sensor (e.g., a rate sensor from generated back EMF), or numerous other devices. It should also be noted that although some of the conductors may be depicted as curved, this is done merely to convey a three-dimensional (3D) spherical shape.

Figure 1:
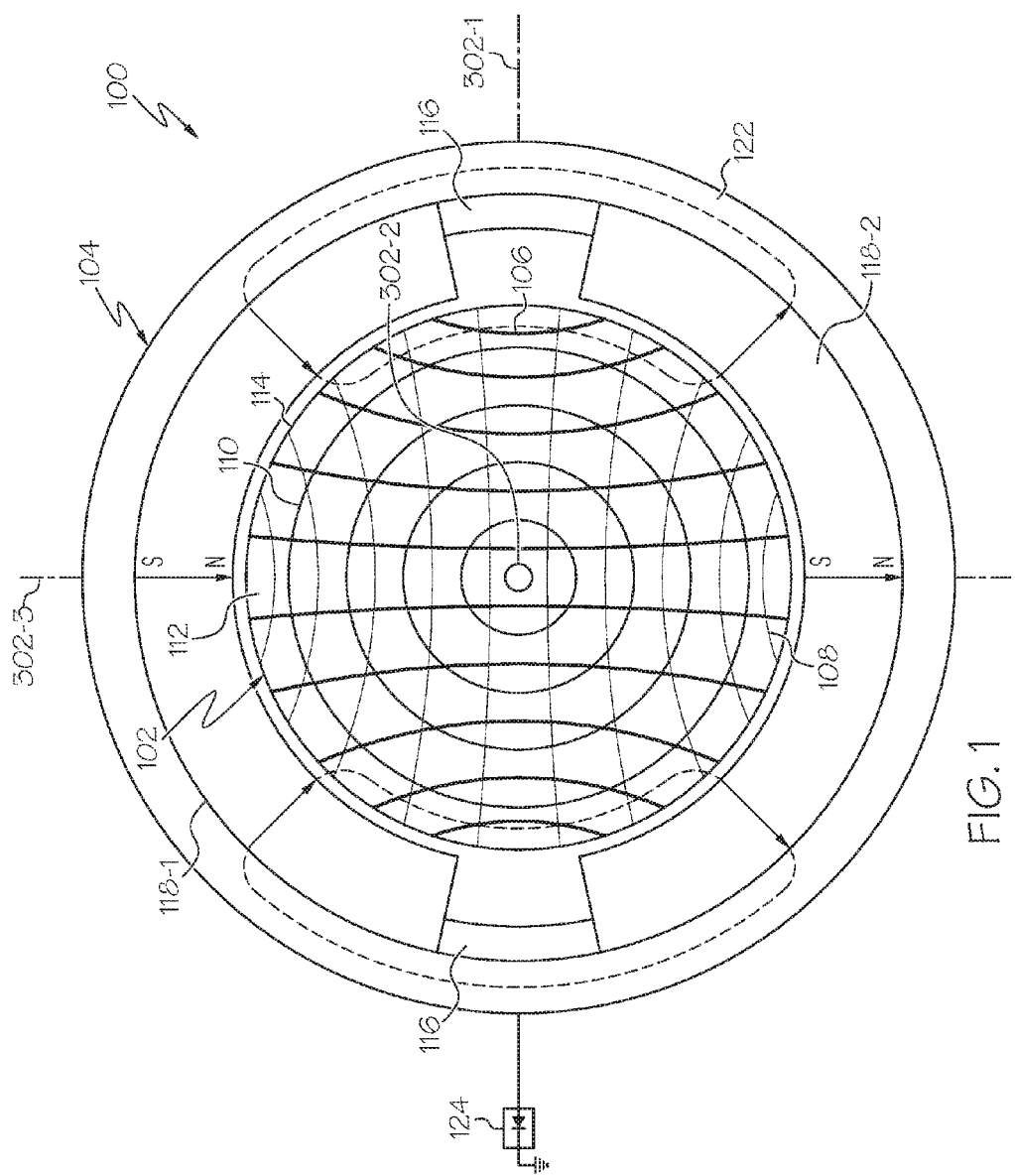
FIG. 1 depicts a simplified cross section view of one example embodiment of a multi-degree of freedom electromagnetic machine.

With reference now to FIG. 1, a simplified cross section view of one embodiment of a multi-degree of freedom electromagnetic machine 100 is depicted, and includes a stator 102 and a armature 104. The stator 102 includes a first stator conductor 106, a second stator conductor 108, and a third stator conductor 110. It will be appreciated that the stator conductors 106, 108, 110 are each formed of any one of numerous types and shapes of electrically conductive materials, and may be implemented using one or a plurality of these conductive materials. It will additionally be appreciated that the stator conductors 106, 108, 110 may each be implemented using single, discrete contiguous conductors, or using a plurality of conductors, and may be formed, for example, using additive (e.g., printed conductors) or subtractive (e.g., PWB etching) techniques, and may be conductive wires, ribbons, or sheets, just to name a few non-limiting examples.

Figure 2:
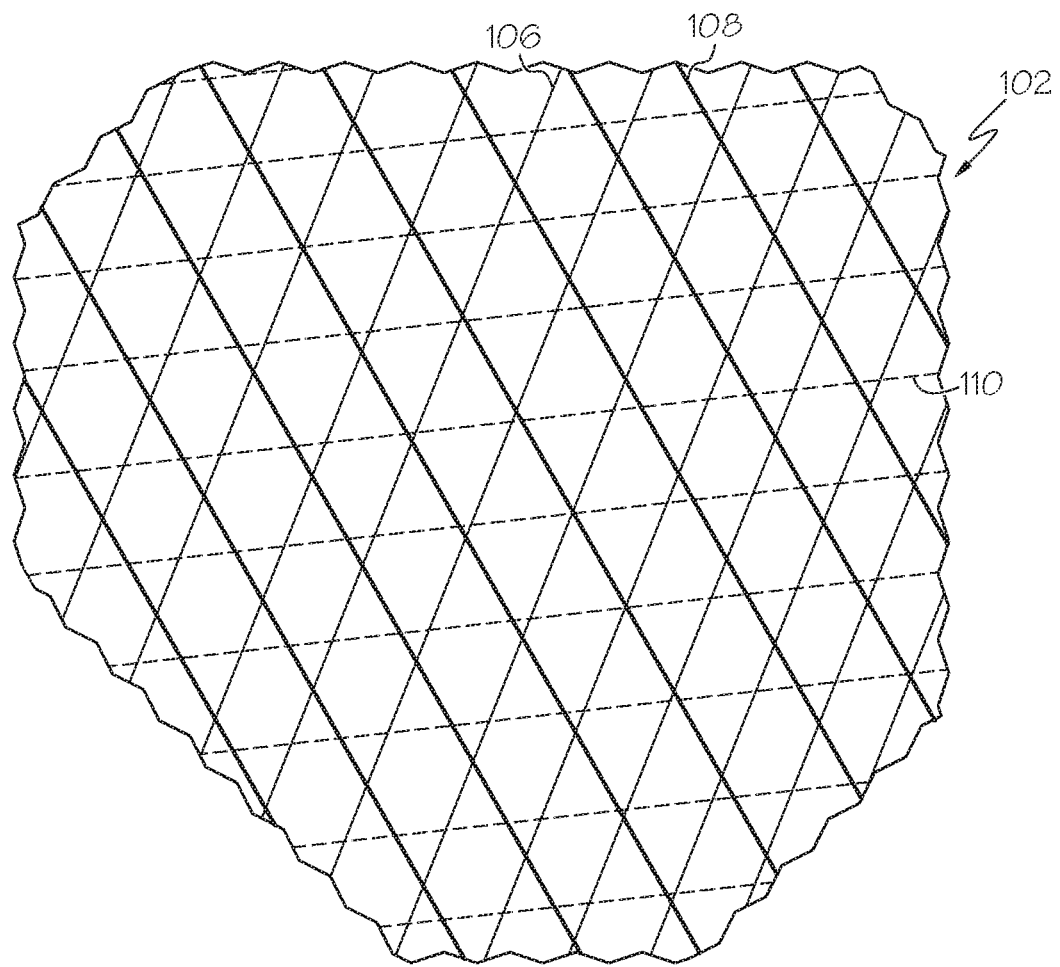
FIG. 2 depicts a simplified representation of a portion of another embodiment of a multi-degree-of-freedom electromagnetic machine.

Regardless of the number, configuration, implementation, or type of materials used, the stator conductors 106, 108, 110 are disposed such that each follows a different general trajectory. In particular, it is seen that the first stator conductor 106 follows a first general trajectory, the second stator conductor 108 follows a second general trajectory that is different from the first general trajectory, and the third stator conductor 110 follows a third general trajectory that is different from the first and second general trajectories. In the embodiment depicted in FIG. 1, the trajectories are orthogonal to each other. It will be appreciated, however, that in some embodiments, such as the one depicted in FIG. 2, two or all three of the trajectories may be disposed at equal or non-equal arbitrary and non-orthogonal angles relative to each other angles.

Before proceeding further, it is noted that the term "trajectory(ies)," as used herein, means the geometric path traced by a conductor over a predefined length that is designed to contribute to the generation of a Lorentz force (described further below). For example, in some embodiments there may be some conductive lengths that may follow a trajectory to, for example, a power supply. These lengths, however, do not contribute to the Lorentz force, and likely do not contribute to the general shape of the surface. It is additionally noted that the stator conductors 106, 108, 110 may be wound manually with wires, or may be printed onto a flexible or spherical surface using known printing methods. Moreover, each conductor 106, 108, 110 may have different characteristics. For example, the stator conductors 106, 108, 110 may differ from each other in size, number of turns, and resistance, and may also be machined or formed as a solid piece, just to name a few characteristics. Doing so allows one to relatively easily and independently tailor each axis to have different performance characteristics, if needed or desired.

Returning to the description, the first, second, and third trajectories are such that together the stator conductors 106, 108, 110 form the general shape of a surface. The surface can be formed by simply overlaying the conductors (and securing them, e.g. via adhesive), or may be formed by weaving two or more conductors. In the case of weaving, attention to the effects of the waviness on overall efficiency may need to be considered, as the Lorentz force produced on the conductor is a function of the angle between the magnetic field and the current path. Thus, if the field and the current are not orthogonal to each other, the force is reduced.

Figure 3:
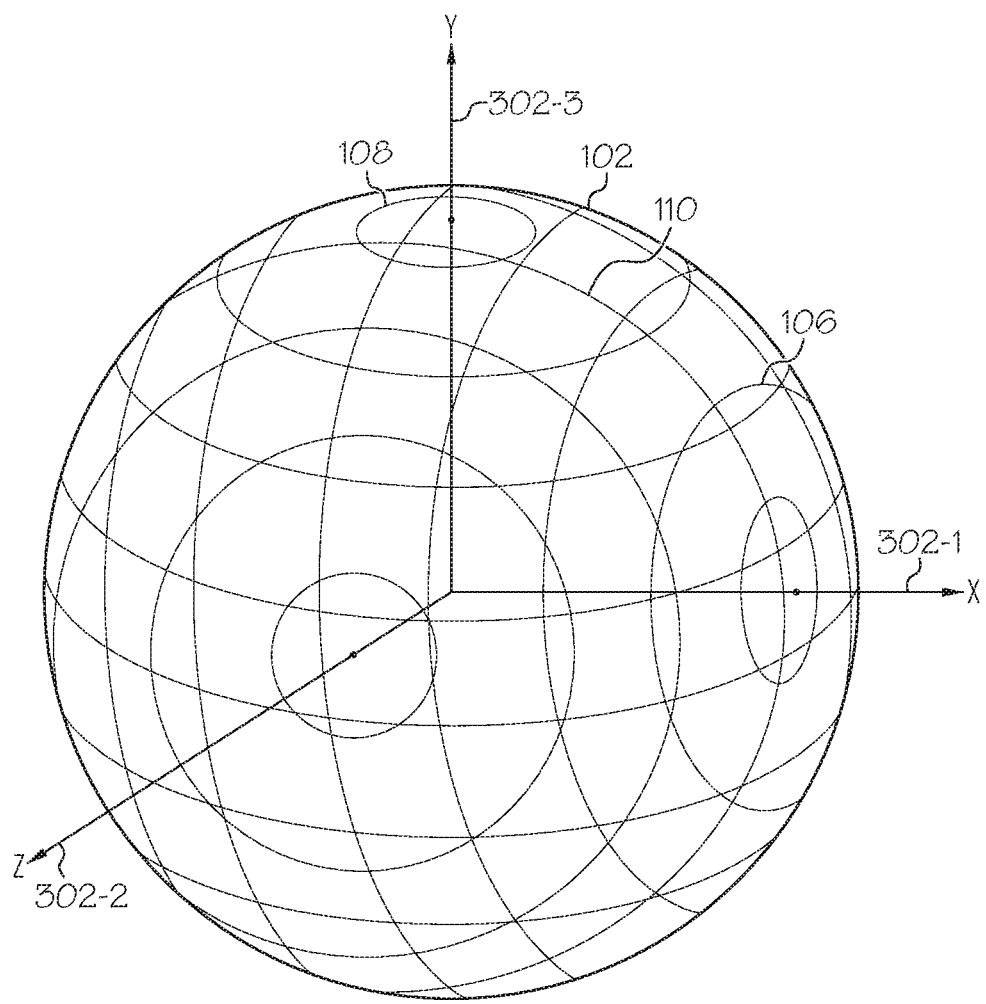
FIG. 3 depicts a perspective view of an embodiment of a spherical structure with orthogonally arranged conductor sets disposed thereon.

The type and shape of the surface may vary, and may be a closed surface, an open surface, a combination of closed and open surfaces, a planar surface, a non-planar surface, or a combination of planar and non-planar surfaces. For example, the surface may be spherical, semispherical, toroidal, cylindrical, cubic, flat, a half-pipe, or various combinations thereof, just to name a few. In the embodiment depicted in FIG. 1, and as is depicted more clearly in FIG. 3, the surface is spherical, and thus has three perpendicularly disposed axes of symmetry 302—a first axis of symmetry 302-1, a second axis of symmetry 302-2, and a third axis of symmetry 302-3. In this embodiment, the first stator conductor 106 is disposed about the first axis of symmetry 302-1, the second stator conductor 108 is disposed about the second axis of symmetry 302-2, and the third stator conductor 110 is disposed about the third axis of symmetry 302-3. It should be noted that a sphere has an infinite number of axes of symmetry. Thus, the first, second, and third axes of symmetry 302-1, 302-2, 302-3, could be any one of these axes of symmetry, so long as all three axes of symmetry are perpendicular to each other.

Returning once again to FIG. 1, it is noted that in some embodiments the stator 102 comprises only the stator conductors 106, 108, 110. In other embodiments, however, the stator 102 further comprises a first body 112. The first body 112, when included, is preferably formed of magnetically permeable material and has an outer surface 114. As is well known, such materials are used to conduct magnetic flux efficiently through the magnetic circuit, and to guide the flux to desired points/locations. Numerous suitable materials are known and include, for example, magnetic steel, iron, and iron alloys (e.g., silicon iron, iron-cobalt, vanadium). At least a portion of the outer surface 114 of the first body 112 preferably has the general shape of the surface, and the stator conductors 106, 108, 110 are disposed at least adjacent to at least the portion of the outer surface 114 of the first body 112.

The armature 104 is disposed adjacent to the stator 102 and includes at least an armature conductor 116 and a plurality of magnets 118 (e.g., a first magnet 118-1 and a second magnet 118-2). In the depicted embodiment, each magnet 118 extends inwardly from an inner surface of a mount structure 122, and each is disposed such that at least one of its magnetic poles faces the stator 102. The mount structure 122, when included, preferably comprises a magnetically permeable material such as, for example, iron or an iron alloy, and may completely surround the stator 102, as depicted in FIG. 1, or may only partially surround the stator 102, as depicted in FIG. 4.

The armature 104 is mounted such that it is movable relative to the stator 102. Preferably, the armature 104 is mounted such that it is movable, relative to the stator 102, about two or three of the axes of symmetry 302. As a result, a non-depicted device, such as a sensor, a laser, or other suitable device, which may be mounted on an outer surface of the armature 104, may be moved to a desired position. The manner in which this movement is accomplished will be described further below.

Figure 5:
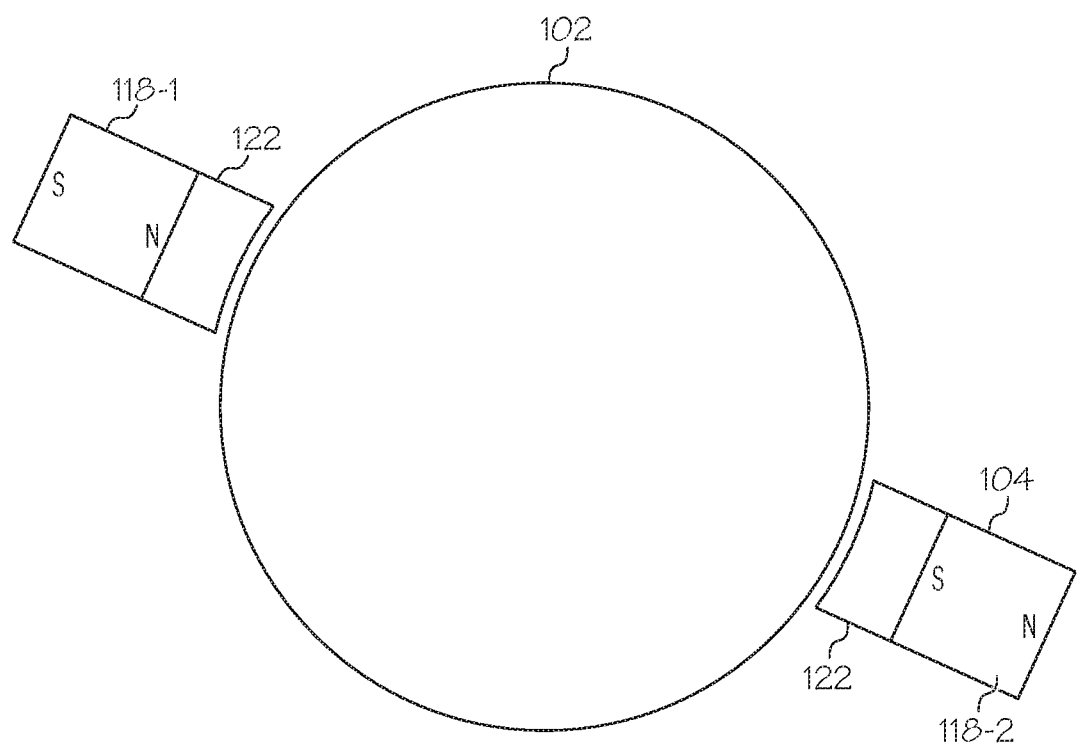
FIGS. 5-7 depict alternative arrangements and configurations of portions of the machine described herein.
Figure 6:
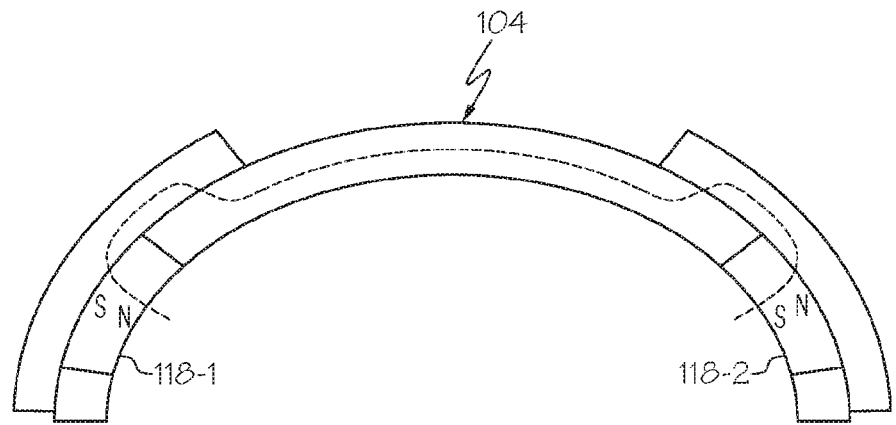
Figure 7:
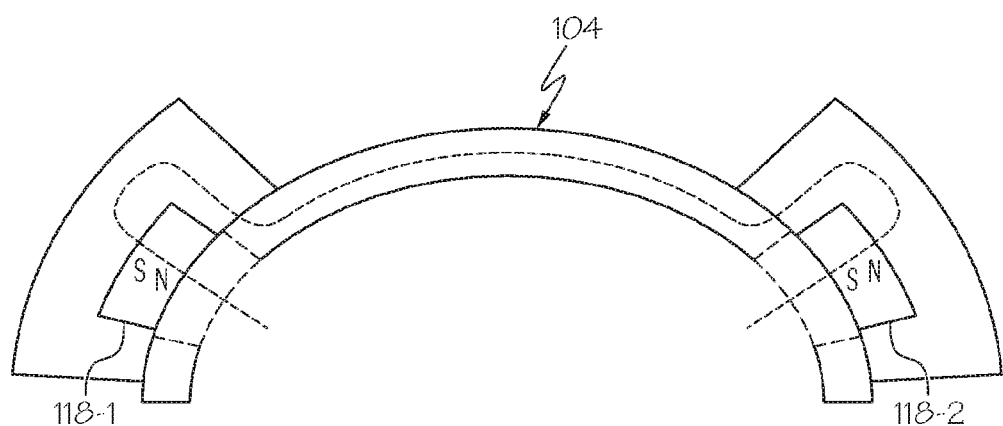

It will be appreciated that the magnets 118 may be variously shaped and dimensioned, and may be variously disposed. For example, in the depicted embodiment the magnets 118 are generally arc-shaped, but in other embodiments the magnets 118 may be semi-spherically shaped, or any one of numerous other shapes if needed or desired. It will additionally be appreciated that the arc length of the magnets 118 may be varied. Moreover, while the portion of the magnets 118 that face the stator 102 are preferably, for efficiency, contoured similar to the stators 102, these portions need not be so contoured. In an embodiment depicted in FIG. 5, for example, the magnets 118 may each be disposed on or mounted on the magnetically permeable mount structure 122 that, preferably (though not necessarily), is at least partially contoured similar to the stator 102 and is disposed adjacent to the stator 102. And, as FIGS. 6 and 7 depict, the magnets 118 may be integrally formed as part of the mount structure 122 (FIG. 6), or may be formed separately but surrounded by at least a portion of the mount structure (FIG. 7). It is noted that the embodiment depicted in FIG. 7 may optionally include holes or slots (depicted in phantom) to force the flux in the depicted path. These holes or slots may optionally be filled with a suitable material, such as epoxy.

Figure 4:
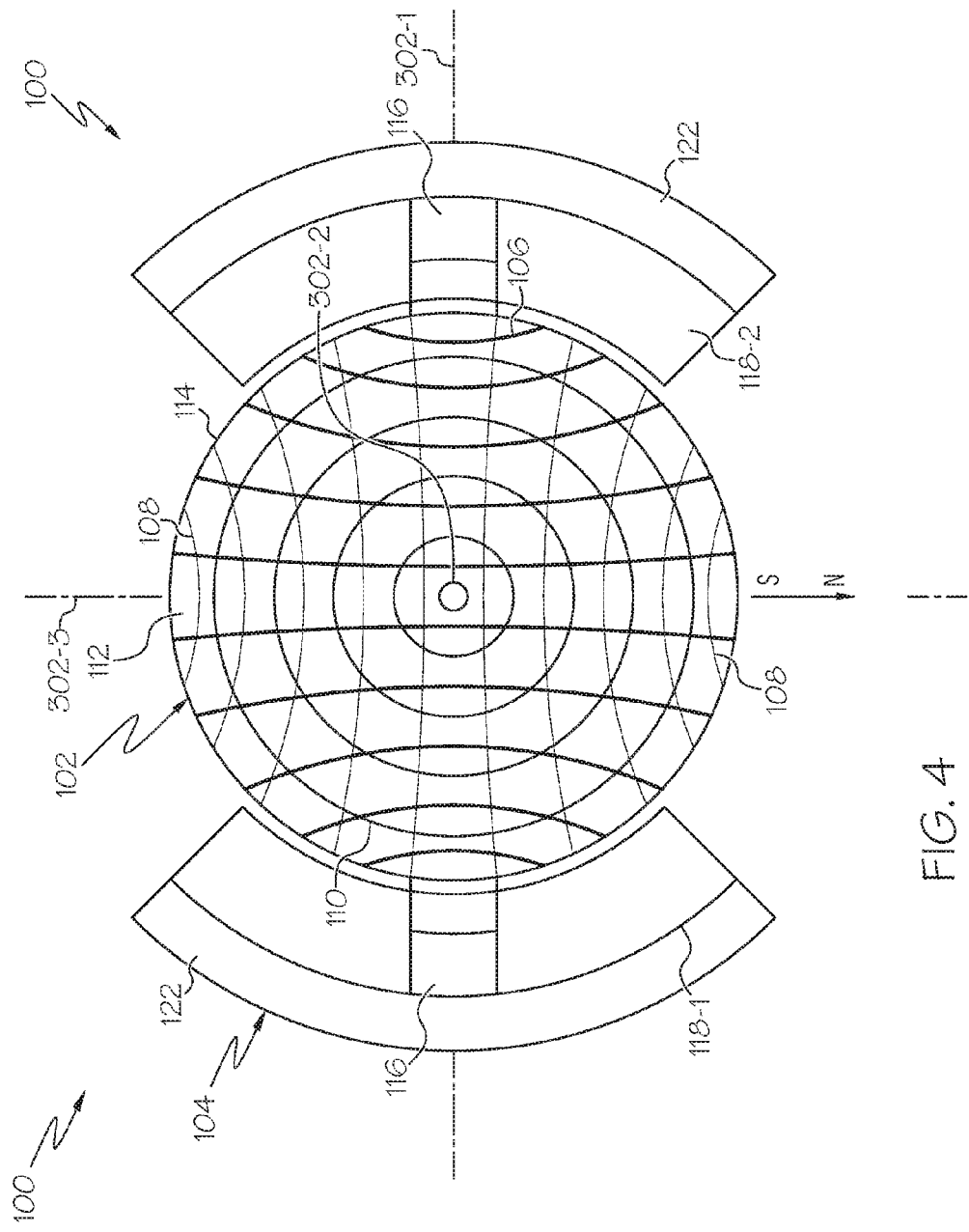
FIG. 4 depicts a simplified cross section view of another example embodiment of a multi-degree of freedom electromagnetic machine.

In some embodiments, such as the ones depicted in FIGS. 1 and 4, the magnets 118 are disposed such that the magnetic pole facing the stator 102 is spaced apart therefrom by a predetermined gap. The gap, when included, is preferably small enough to minimize losses, which increases the magnetic efficiency by reducing magnetic reluctance. A relatively larger gap may allow for a more cost-effective design by loosening mechanical tolerances. In other embodiments, the magnets 118 may be disposed such that the magnetic pole contacts the stator 102. In such embodiments, the material selection of the contacting surfaces is chosen in consideration of wear and frictional losses, as is known in the art.

It will additionally be appreciated that the magnets 118 may be variously implemented. For example, the magnets may be implemented as permanent magnets or as electromagnets. If implemented as permanent magnets, each magnet 118 may be implemented as a Halbach array. Some non-limiting examples of sources of suitable permanent magnets include Electron Energy Corporation (Landisville, Pa.), Arnold Magnetic Technologies (Rochester, N.Y.), Dexter Magnetic Technologies (Elk Grove Village, Ill.), and Dura Magnetics (Sylvania, Ohio).

Regardless of its shape, dimension, configuration, and implementation, each magnet 118 emanates a magnetic field, and each is preferably arranged such that the polarity of the first magnet 118-1 relative to the stator 102 is opposite to the polarity of the second magnet 118-2. For example, in the embodiment depicted in FIG. 1, the north pole (N) of the first magnet 118-1 is disposed closer to the stator 102, whereas the south pole (S) of the second magnet 118-2 is disposed closer to the stator 102.

The configuration of the stator conductors 106, 108, 110, and the magnets 118 is such that magnetic flux travels from the one magnet (e.g., the first magnet 118-1) into the stator 102 on one side and back out on the other side to the other magnet (e.g., the second magnet 118-2). The magnetic flux travels through the stator conductors 106, 108, 110, and the magnetically permeable mount structure 122 provides the return path for the magnetic flux. As may be appreciated, when direct current (DC) is supplied to one or more of the stator conductors 106, 108, 110, the above-mentioned Lorentz force is generated between the energized conductor(s) 106, 108, 110 and the magnets 118, which in turn generates in a torque about one or more of the axes of symmetry 302. The direction of the generated torque, as may also by appreciated, is based on the direction of the current flow in the conductor(s) 106, 108, 110. Because the stator 102 is fixedly mounted, the torque that is generated will cause the armature 104 to move to an armature position relative to the stator 102.

Figure 8:
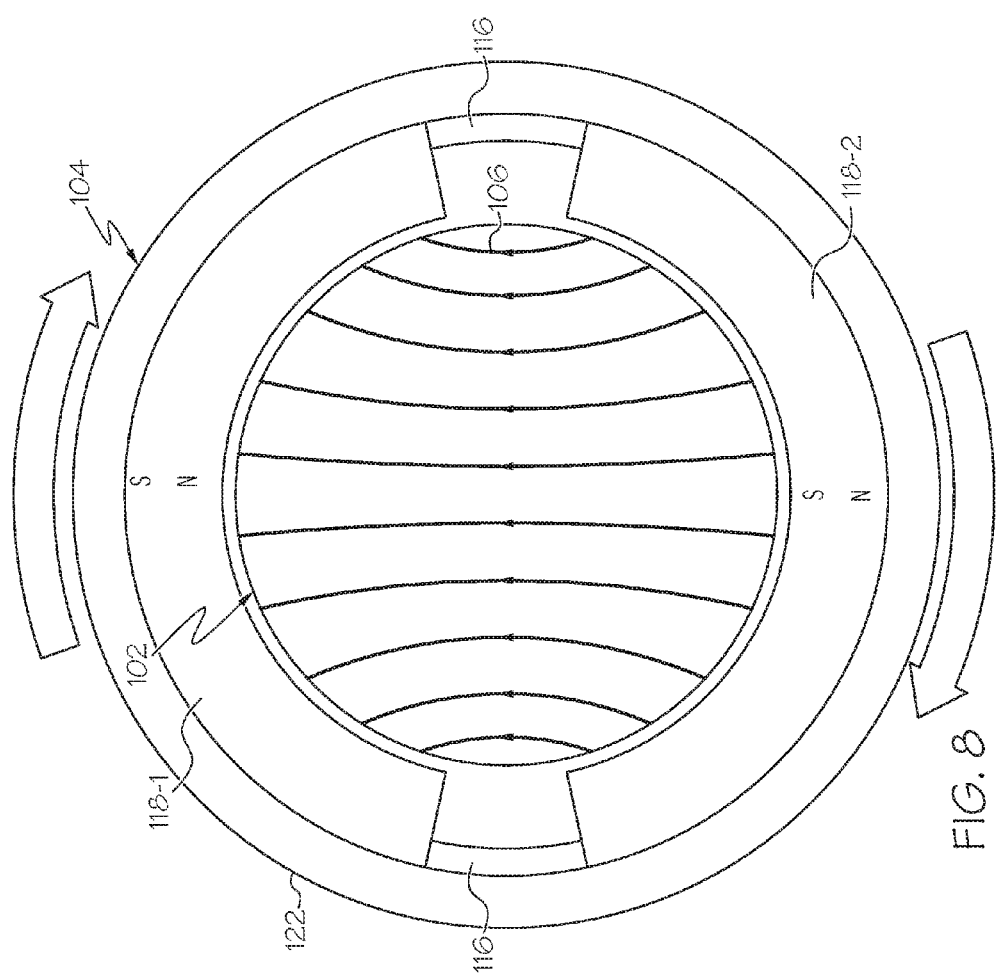
FIG. 8 depicts a simplified cross section view of the multi-degree of freedom electromagnetic machine of FIG. 1, illustrating how a torque is generated.

Referring now to FIG. 8, an example of the torque that is generated when one of the stator conductors 106, 108, 110 is energized will now be described. For clarity, and ease of illustration, only a single stator conductor 106, 108, 110 (e.g., the first stator conductor 106) is depicted. As FIG. 8 depicts, when the first stator conductor 106 is supplied with DC in the depicted direction, a torque is generated about the second axis of symmetry 302-2 in the clockwise direction (as viewed from the perspective of FIG. 8). It will be appreciated that reversing the direction of the current will generate a torque in the opposite (i.e., counterclockwise) direction. It will additionally be appreciated that the magnitude of the torque may be varied by varying the magnitude of the current supplied to the stator conductor 106.

Figure 9:
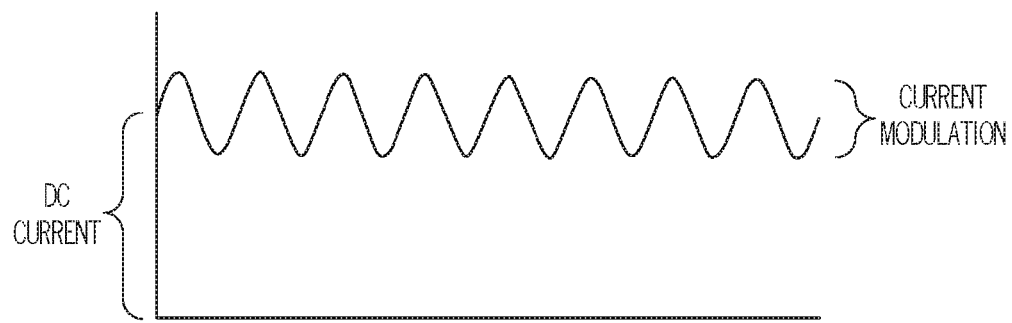
FIG. 9 depicts an example amplitude modulated DC signal that may be supplied to one or more stator conductors.

In addition to the above, it should be noted that if the DC supplied to one or more of the stator conductors 106, 108, 110 is amplitude modulated, as depicted, for example, in FIG. 9, the armature conductor 116 is electromagnetically coupled, via transformer action, to the amplitude modulated stator conductors 106, 108, 110. Basically, the stator conductors 106, 108, 110 effectively implement a transformer primary, and the armature coil 116 effectively implements a transformer secondary. As may be appreciated, for a given amplitude magnitude, the armature conductor 116 will be electromagnetically coupled more strongly to the stator conductors 106, 108, 110 being amplitude modulated at a higher modulation frequency. Thus, via the armature conductor 116, an additional degree of control of the armature 104 may be provided. Specifically, as noted above, the magnets 118 react to the ratio of the DC magnitudes in the stator conductors 106, 108, 110, and the armature conductor 116 reacts to the ratio of the modulation frequencies of the DC in the stator conductors 106, 108, 110.

It should be noted that the frequency of the amplitude modulation should be relatively high. For example, the frequency should be at 1 kHz. A relatively high amplitude modulation frequency will ensure that the armature 104 does not react mechanically, and therefore does not adversely affect the DC operation of the machine 100.

Figure 10:
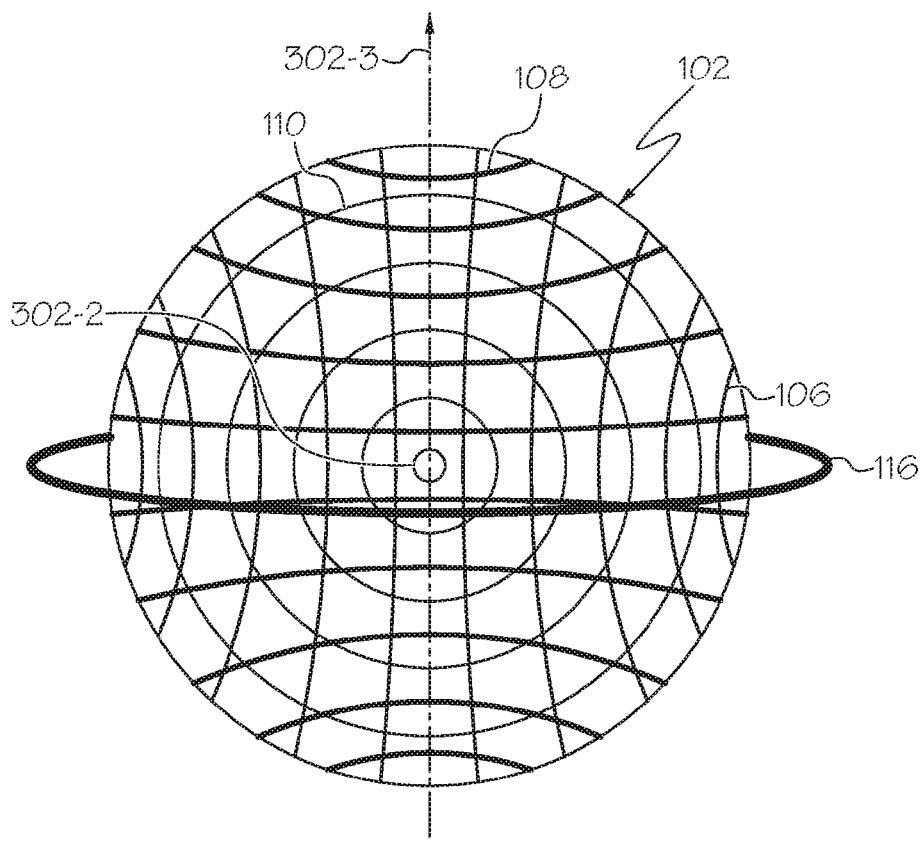
FIGS. 10 and 11 depict the multi-degree of freedom electromagnetic machine of FIGS. 1 and 4 implementing position control using amplitude modulated DC.
Figure 11:
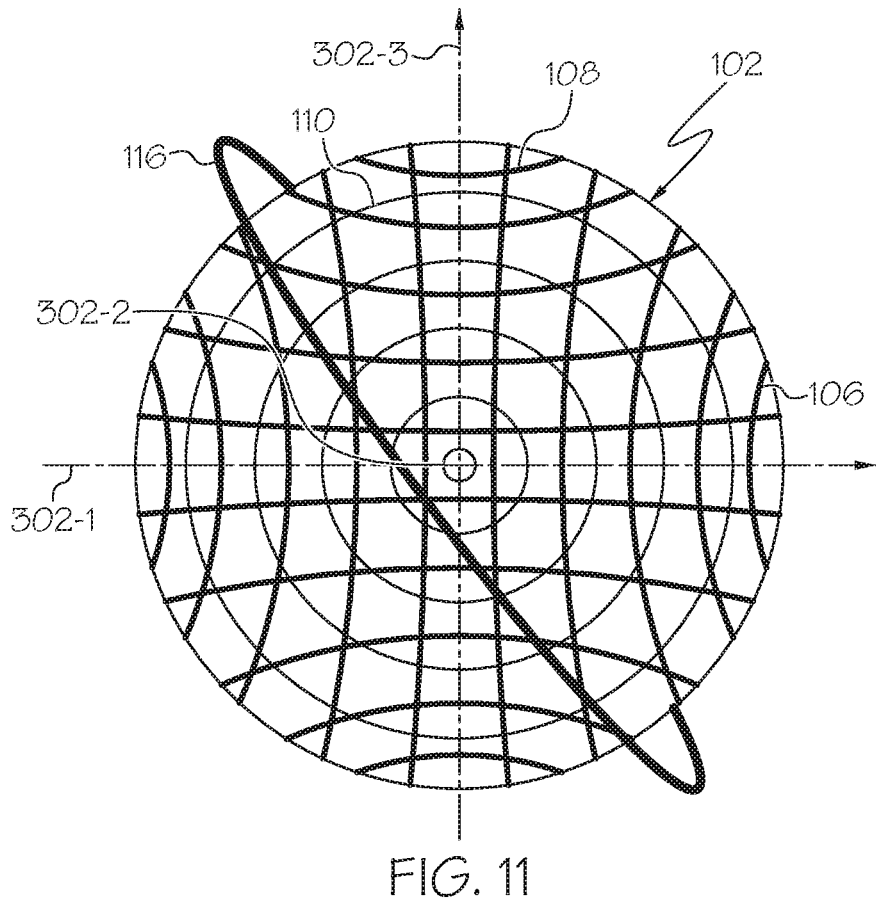

With reference to FIGS. 10 and 11, examples of the torque that is generated when the DC supplied to one or more of the stator conductors 106, 108, 110 is amplitude modulated will now be described. For clarity, and ease of illustration, only the armature conductor 116, and not the magnets 118 or mount structure 122, is depicted in these figures. As FIG. 10 depicts, when the second stator conductor 108 is supplied with amplitude modulated DC (illustrated using relatively bolder lines), the electromagnetic coupling is strongest when the axes of the second stator conductor 108 and the armature conductor 116 are aligned. However, as FIG. 11 depicts, when the first and second stator conductors 106, 108 are supplied with amplitude modulated DC (of equal magnitude and modulation frequency), the axis of the primary transformer is effectively changed, causing the armature conductor 116 to move to maximize its electromagnetic coupling efficiency with the first and second stator conductors 106, 108.

Figure 12:
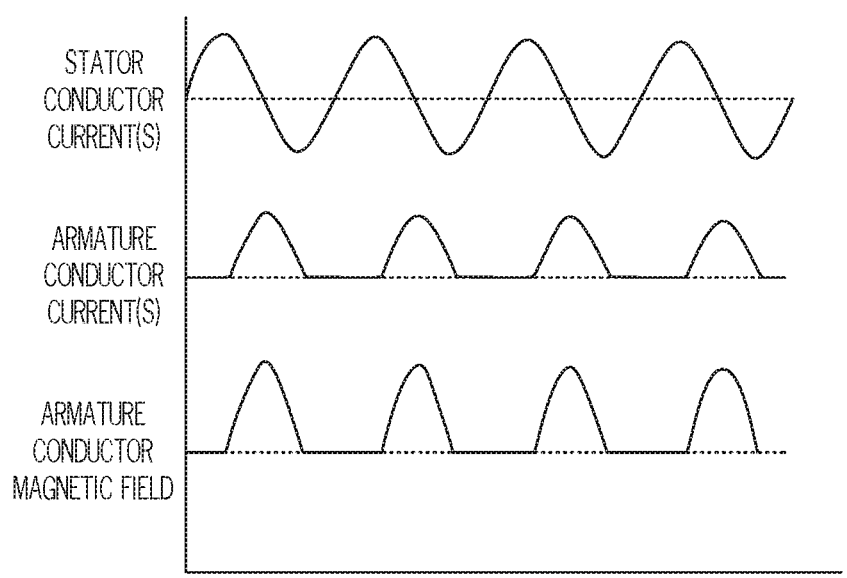
FIG. 12 depicts various waveforms of another control methodology for the multi-degree of freedom electromagnetic machine of FIGS. 1 and 4.

In another embodiment, the machine may additionally include a rectifier circuit (see FIG. 1). As illustrated in FIG. 12, the rectifier circuit 124, if included, will rectify the modulated current in the armature conductor 116. As a result, the armature conductor 116 implements an electromagnet with a single polarity, which can then be aligned magnetically with the magnetic fields generated by the amplitude modulated DC in the stator conductors 106, 108, 110.

Figure 13:
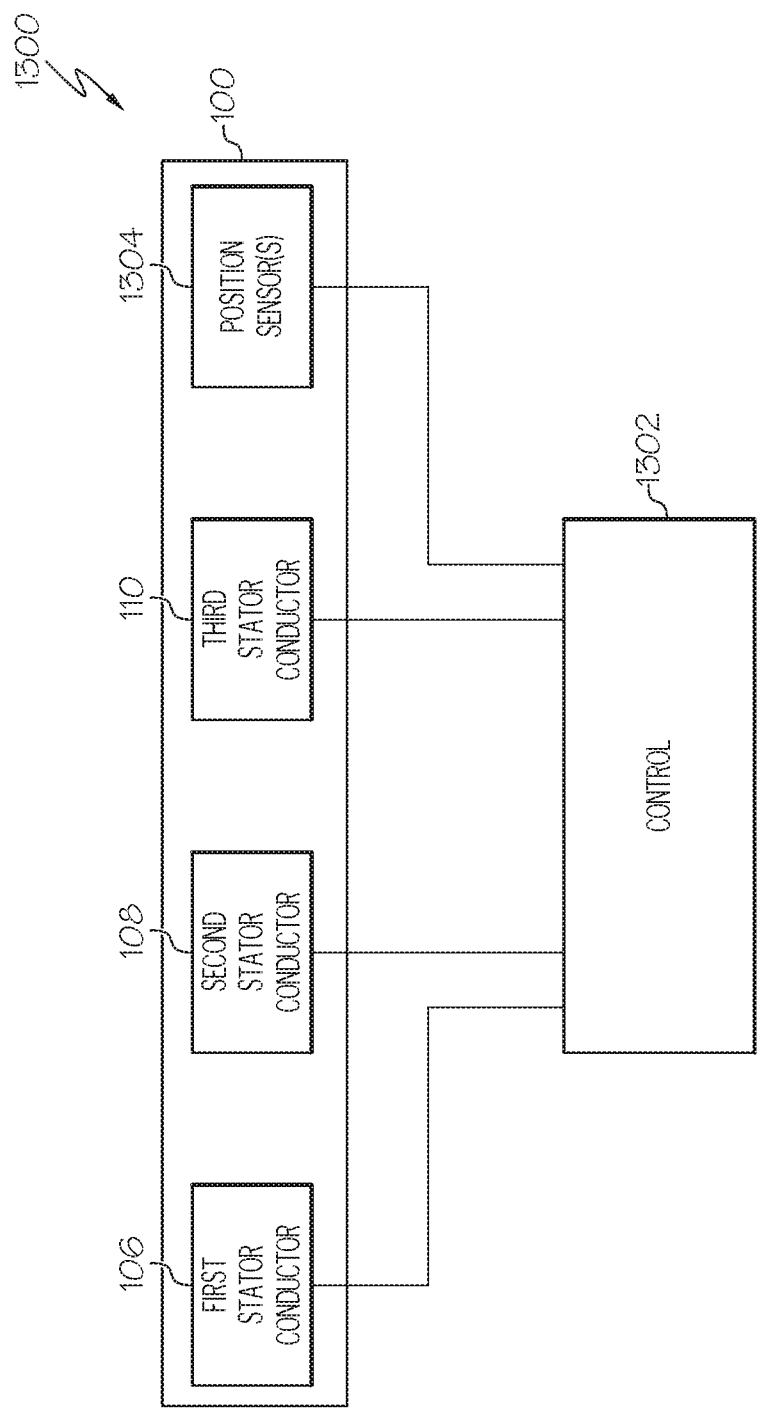
FIG. 13 depicts a functional block diagram of a multi-degree of a control system that may be used to control the electromagnetic machine described herein.

Referring now to FIG. 13, a functional block diagram of a multi-degree of freedom actuation control system 1300 that includes the multi-degree of freedom electromechanical machine 100 of FIG. 1 is depicted. As FIG. 13 depicts, the system 1300 includes a control 1302 that is coupled to each of the stator conductors 106, 108, 110. The control 1302 is configured to control the current magnitudes and directions in each of the conductors 108 to thereby control the spin rate and direction, and the tilt angle, of the stator 102. The control 1302 may be configured to implement this functionality using either open-loop control or closed-loop control. Open-loop control provides relatively lower cost, less complexity, relatively simple DC operation, and relatively lower size and weight. Closed-loop control provides higher accuracy and precision, higher bandwidth, and autonomous control. Various control techniques could be implemented in the control 1302. Some non-limiting examples of suitable control techniques include PWM control and back EMF control.

If the control 1302 implements closed-loop control, then the control system 1300 additionally includes one or more position sensors 1304. The number and type of position sensors 1304 may vary. For example, the system 1300 may include one or more sensors 1304 to independently sense the position of the stator 102. Such sensors may be implemented using optical sensors, track balls, rotary sensors, or the like. In other embodiments, the sensor 1004 may be implemented using an optical mask that is applied to the surface of the stator 102, which can then be read by an optical sensor mounted on the inner surface of the armature 104.

It will be appreciated that data and power may be transmitted to and from the stator conductors 106, 108, 110 and position sensor(s) 1304 (if included), using any one of numerous techniques. For example, data may be transmitted wirelessly, via flexible conductors, or via miniature slip rings, and power may be transmitted via flexible conductors, via miniature slip rings, or provided via a battery. In one particular embodiment, the stator conductors 106, 108, 110 are connected to the control via a slip ring mechanism.

The multi-degree of freedom machine 100 disclosed herein The armature 104 can be controllably moved to and held in a desired armature position relative to the stator 102. The armature position may be controlled by not only controlling the magnitudes and directions of the DC in the stator conductors 106, 108, 110, but also (or instead) by controlling the modulation frequencies of the DC in the stator conductors 106, 108, 110.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A multi-degree-of-freedom electromagnetic machine, comprising:
   a stator comprising a first stator conductor, a second stator conductor, and a third stator conductor, the first stator conductor following a first general trajectory, the second stator conductor following a second general trajectory that is different from the first general trajectory, the third stator conductor following a third general trajectory that is different from the first and second general trajectories, the first stator conductor, second stator conductor, and third stator conductor together forming a general shape of a surface;
   an armature disposed adjacent to, and movable relative to, the stator, the armature including an armature conductor and a plurality of magnets, each magnet having at least one of its magnetic poles facing the surface; and
   a control coupled to the first, second, and third stator conductors, the control configured to:
   (i) supply direct current (DC) to the first, second, and third stator conductors, and
   (ii) selectively amplitude modulate the DC supplied to one or more of the first, second, and third stator conductors, to thereby electromagnetically couple the armature conductor to the one or more first, second, and third stator conductors.

2. The machine of claim 1, further comprising:
   a rectifier circuit coupled to the armature conductor, the rectifier circuit configured to rectify current induced in the armature conductor.

3. The machine of claim 1, wherein:
   one or more of the first stator conductor, the second stator conductors, and the third stator conductor comprise a plurality of electrically conductive segments; and
   each of the electrically conductive segments comprises a conductor of predetermined length.

4. The machine of claim 1, wherein one or more of the first stator conductor, the second stator conductors, and the third stator conductor comprise a contiguous conductor.

5. The machine of claim 1, wherein:
   the first structure further comprises a first body formed of magnetically permeable material and having an outer surface, at least a portion of the outer surface having the general shape of the surface; and
   the first stator conductor, the second stator conductors, and the third stator conductor are disposed at least adjacent at least the portion of the outer surface of the first structure.

6. The machine of claim 1, wherein:
   the surface is a sphere; and
   the first, second, and third general trajectories are such that the first stator conductor, the second stator conductors, and the third stator conductor are oriented at predetermined angles relative to each other.

7. The machine of claim 1, wherein the magnetic pole facing the surface is spaced apart from the first structure by a predetermined gap.

8. The machine of claim 1, wherein the magnet is selected from the group consisting of a permanent magnet and an electromagnet.

9. A multi-degree-of-freedom electromagnetic machine, comprising:
   a spherical stator having a first axis of symmetry, a second axis of symmetry, and a third axis of symmetry, the first, second, and third axes of symmetry disposed perpendicular to each other;
   a first stator conductor disposed on the spherical structure about the first axis of symmetry;
   a second stator conductor disposed on the spherical structure about the second axis of symmetry;
   a third stator conductor disposed on the spherical structure about the third axis of symmetry;
   an armature disposed adjacent to, and movable relative to, the spherical stator, the armature including an armature conductor and a plurality of magnets, each magnet having at least one of its magnetic poles facing the surface; and
   a control coupled to the first stator conductor, the second stator conductor, and the third stator conductor, the control configured to:
   (i) supply direct current (DC) to the first, second, and third stator conductors, and
   (ii) selectively amplitude modulate the DC supplied to one or more of the first, second, and third stator conductors, to thereby electromagnetically couple the armature conductor to the one or more first, second, and third stator conductors.

10. The machine of claim 9, further comprising:
a rectifier circuit coupled to the armature conductor, the rectifier circuit configured to rectify current induced in the armature conductor.

11. The machine of claim 9, wherein:
one or more of the first stator conductor, the second stator conductors, and the third stator conductor comprise a plurality of electrically conductive segments; and
each of the electrically conductive segments comprises a conductor of predetermined length.

12. The machine of claim 9, wherein one or more of the first stator conductor, the second stator conductors, and the third stator conductor comprise a contiguous conductor.

13. The machine of claim 9, wherein:
the first structure further comprises a first body formed of magnetically permeable material and having an outer surface, at least a portion of the outer surface having the general shape of the surface; and
the first stator conductor, the second stator conductors, and the third stator conductor are disposed at least adjacent at least the portion of the outer surface of the first structure.

14. The machine of claim 9, wherein:
the surface is a sphere; and
the first, second, and third general trajectories are such that the first stator conductor, the second stator conductors, and the third stator conductor are oriented at predetermined angles relative to each other.

15. The machine of claim 9, wherein the magnetic pole facing the surface is spaced apart from the first structure by a predetermined gap.

16. The machine of claim 9, wherein the magnet is selected from the group consisting of a permanent magnet and an electromagnet.

17. A method of controlling a multi-degree-of-freedom electromagnetic machine that includes a stator and an structure, wherein the stator includes a first stator conductor, a second stator conductor, and a third stator conductor, where the first stator conductor follows a first general trajectory, the second stator conductor follows a second general trajectory that is different from the first general trajectory, the third stator conductor follows a third general trajectory that is different from the first and second general trajectories, and where the first stator conductor, the second stator conductor, and the third stator conductor together form a general shape of a surface; and wherein the armature is disposed adjacent to, and is movable relative to, the stator and includes an armature conductor and a plurality of magnets, each magnet having at least one of its magnetic poles facing the surface, the method comprising the steps of:
controllably supplying direct current (DC) to one or more of the first, second, and third stator conductors; and
selectively amplitude modulating the DC supplied to one or more of the first, second, and third stator conductors, to thereby induce current in the armature conductor.

18. The method of claim 17, further comprising rectifying current induced in the armature conductor.

* * * * *